United States Patent
Gambling et al.

[11] 3,894,788
[45] July 15, 1975

[54] LIQUID-CORE FIBRE-OPTIC WAVEGUIDES

[75] Inventors: William Alexander Gambling, Chandlers Ford; David Neil Payne, Southampton, both of England

[73] Assignee: National Research Development Corporation, London, England

[22] Filed: June 4, 1973

[21] Appl. No.: 367,053

[30] Foreign Application Priority Data
June 5, 1972 United Kingdom............... 26054/72

[52] U.S. Cl......... 350/96 WG; 65/DIG. 7; 350/96 R
[51] Int. Cl............................................... G02b 5/14
[58] Field of Search............ 350/96 R, 96 WG, 179

[56] References Cited
UNITED STATES PATENTS
3,740,113  6/1973  Cass................................. 350/96 R
3,814,497  6/1974  Stone............................ 350/96 WG OTHER PUBLICATIONS
Stone, "Optical Transmission in Liquid–Core Quartz Fibers," Vol. 20, No. 7, April, 1972, pp. 239, 240.

*Primary Examiner*—John K. Corbin
*Attorney, Agent, or Firm*—Elliott I. Pollock

[57] ABSTRACT

A liquid-core fibre-optic waveguide comprising a hollow vitreous fibre filled with a liquid wherein the liquid is substantially a single compound, a mixture of compounds, or a single compound or a mixture of compounds dissolved in or diluted with a solvent, the said compound or compounds being selected from the class of aliphatic compounds which contain from three to seven carbon atoms per molecule and are fully halogenated with fluorine, chlorine, bromine or any combination thereof, such that the liquid is liquid at 25° centigrade, has a refractive index greater than that of the vitreous fibre and has minimal optical absorption and scattering throughout at least a substantial part of the spectral range from 0.5 to 2.0 microns. The preferred vitreous fibre is soda-lime borosilicate glass and the preferred liquid is hexachloro-1,3-butadiene. Alternative liquids are hexachloropropene and 1,4-difluoroctachlorobutane; a mixture of any two or all three of these compounds may be used in a silica or quartz fibre. Heating or the addition of a solvent may be used to facilitate the filling of the fibre with the liquid. The preferred solvents are carbon tetrachloride and tetrachloroethylene but bromo-trichloromethane or tribromo-fluoromethane could alternatively be used.

9 Claims, No Drawings

LIQUID-CORE FIBRE-OPTIC WAVEGUIDES

The present invention relates to liquid-core fibre-optic waveguides.

Fibre-optic waveguides may be used for transmitting information in adverse electrical environments, and offer a greater potential information carrying capacity than conventional electrical methods. Fibre-optic waveguides are normally constructed wholly of glass and consist of two parts, an inner core through which optical signals are transmitted and an outer sheath having a lower refractive index than that of the core, to ensure that the optical signal will be confined substantially within the core by total internal reflection. Attenuation of the light beam when transmitting information over long distances is a major problem due to difficulties in fabricating the fibres and of obtaining suitable glasses of sufficient purity.

An alternative method of constructing fibre-optic waveguides is to fill a hollow fibre with a liquid having a higher refractive index than that of the fibre. This method of construction has been reported by J. Stone in IEEE J Quantum Electronics, Vol. QE-8, Pg. 386, Mar. 1972, and in Applied Physics Letters, Vol. 20, pg. 239, 1 Apr. 1972, but the range of optical frequencies for which these waveguides are considered acceptable for long-distance communications is restricted by absorption and scatter characteristics of the liquid used. It is of course necessary to use a liquid which is optically transparent in the spectral region to be used and it is preferable that any optical absorption band which the liquid may have should be as far removed as possible from this spectral region. The liquid must have a suitable refractive index relative to the material of the fibre; the choice of liquid may limit the choice of suitable materials for the fibre. Thus some of the liquids which have been used are only suitable for use in hollow fibres of quartz or vitreous silica. For practical long-distance communications, it is desirable to have fibres several kilometres long and since they must be of rather fine bore they may be very difficult to fill with liquid unless the liquid has a fairly low viscosity. The liquid must also be stable and not likely to suffer any phase changes at normal atmospheric temperatures so that it will not become solid or gaseous in any part of the waveguide in any environment in which it is to be used.

It is an object of the invention to provide liquid-core fibre-optic waveguides which may be convenient to form and give low attenuation in use.

According to the present invention, there is provided a liquid-core fibre-optic waveguide comprising a hollow vitreous fibre filled with a liquid wherein the liquid is substantially a single compound, a mixture of compounds or a single compound or a mixture of compounds dissolved in or diluted with a solvent, the said compound or compounds being selected from the class of aliphatic compounds which contain from three to seven carbon atoms per molecule and are fully halogenated with fluorine, bromine or chlorine or any combination thereof, such that the liquid is liquid at 25° centigrade, has a refractive index greater than that of the vitreous fibre and has minimal optical absorption and scattering throughout at least a substantial part of the spectral range from 0.5 to 2.0 microns.

Preferably, the liquid is a single compound and the preferred compound is hexachloro-1,3-butadiene; hexachloropropene and 1,4-difluorooctachlorobutane are alternatives and any mixture of any two, or all three, of these compounds should also be suitable. It should be noted that the term "aliphatic" is here to be interpreted as including unsaturated compounds, that is to say including compounds having one or more double bonds or even triple bonds. Heating, or the addition of a solvent may be used to facilitate the filling of the fibre with the liquid. Preferred solvents are carbon tetrachloride or tetrachloroethylene, which have been used as core liquids for liquid-core fibre-optic waveguides in the prior art. Other suitable solvents are bromotrichloromethane, and tribromo-fluoromethane.

The vitreous fibre may be a soda-lime borosilicate glass. Vitreous silica or quartz may be used, but it is considered a substantial advantage of the preferred compound that it has a refractive index high enough to allow it to be used in a borosilicate glass fibre and therefore does not require the use of quartz. It may be necessary to use a silica or quartz fibre where hexachloropropene or difluorooctachlorobutane are used.

A specific example of the invention, given by way of example only, is a liquid-core fibre-optic waveguide in which the fibre is constructed of Chance Pilkington ME-1 glass filled with hexachloro-1,3-butadiene, giving an attenuation of 10dB/Km at an optical wavelength of 1.08 microns in tests using light from a filtered tungsten/halogen lamp, and may be used in the spectral region 0.5 to 2.0 microns inclusive.

A further example is a liquid-core fibre-optic waveguide comprising a fibre of the said ME-1 glass filled with some hexachloro-1,3 butadiene which had been purified by vacuum distillation. This gave attenuation of 30dB/Km at the He/Ne laser wavelength of 0.633 $\mu$m, 8dB/Km at a wavelength of 0.9 $\mu$m, and a minimum measured attenuation of 5.8dB/Km at a wavelength of 1.06 $\mu$m. An alternative to the Chance-Pilkington ME-1 glass is the glass No. 8243 made by Schott GmbH at the Jena Glass Works at Mainz in Germany.

We claim:

1. A liquid-core fibre-optic waveguide comprising a hollow vitreous fibre filled with a liquid which consists essentially of one or more compounds selected from the classes of aliphatic compounds which contain three or four carbon atoms per molecule and are fully halogenated with at least one of the group of fluorine, chlorine and bromine, such that the liquid is liquid at 25°C, has a refractive index greater than that of the vitreous fibre and has optical absorption and scattering less than 40dB/Km within at least a part of the spectral range from 0.5 to 2.0 microns.

2. A liquid-core fibre-optic waveguide as claimed in claim 1, wherein the liquid is hexachloro-1,3 butadiene.

3. A liquid-core fibre-optic waveguide as claimed in claim 2, wherein the hollow vitreous fibre is composed of soda-lime borosilicate glass.

4. A liquid-core fibre-optic waveguide as claimed in claim 1 wherein the liquid is hexachloropropene.

5. A liquid-core fibre-optic waveguide as claimed in claim 1 wherein the liquid is 1,4-difluorooctachlorobutane.

6. A liquid-core fibre-optic waveguide as claimed in claim 1 wherein the liquid substantially comprises a mixture of compounds selected from the group of hexachloro-1, 3 butadiene, hexachloropropene and 1,4-difluorooctachlorobutane.

7. A liquid-core fibre-optic waveguide as claimed in claim 1 wherein the liquid is diluted with a liquid selected from the group of carbon tetrachloride (or) and tetrachloroethylene.

8. A liquid-core fibre-optic waveguide as claimed in claim 1 wherein the hollow vitreous fibre is composed of vitreous silica or quartz.

9. A liquid-core fibre-optic waveguide comprising a hollow vitreous fibre filled with a liquid which consists essentially of one or more compounds selected from the classes of aliphatic compounds which contain from three to seven carbon atoms per molecule and are fully halogenated with at least one of the group of fluorine, chlorine and bromine such that the liquid is liquid at 25°C, has a refractive index greater than that of the vitreous fibre and has optical absorption and scattering less than 40dB/Km within at least a part of the spectral range from 0.5 to 2.0 microns.

* * * * *